United States Patent
Tezuka

(10) Patent No.: US 9,744,636 B2
(45) Date of Patent: Aug. 29, 2017

(54) ROTATION TABLE

(71) Applicant: FANUC Corporation, Yamanashi (JP)

(72) Inventor: Hiroki Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/604,941

(22) Filed: Jan. 26, 2015

(65) Prior Publication Data
US 2015/0209928 A1 Jul. 30, 2015

(30) Foreign Application Priority Data

Jan. 27, 2014 (JP) .................. 2014-012589

(51) Int. Cl.
*B23Q 16/10* (2006.01)
*B23Q 1/28* (2006.01)

(52) U.S. Cl.
CPC ......... *B23Q 16/102* (2013.01); *B23Q 16/105* (2013.01); *B23Q 1/28* (2013.01); *B23Q 2220/004* (2013.01)

(58) Field of Classification Search
CPC ... B23Q 11/005; B23Q 11/08; B23Q 11/0883; B23Q 1/64; B23Q 1/522; B23Q 1/38
See application file for complete search history.

(56) References Cited

U.S. PATENT DOCUMENTS 3,668,926 A * 6/1972 Bell ...................... G01L 3/1471
73/862.195
5,163,651 A * 11/1992 Matsumoto .............. B23Q 1/38
108/20
2014/0318271 A1* 10/2014 Tezuka ...................... G01L 3/06
73/862.321

FOREIGN PATENT DOCUMENTS

| | | |
|---|---|---|
| DE | 202010009079 U1 | 8/2010 |
| EP | 2106878 A1 | 10/2009 |
| JP | 63-77641 A | 4/1988 |
| JP | 63-74232 U | 5/1988 |
| JP | 63-176050 U | 11/1988 |
| JP | 2009-248242 A | 10/2009 |

OTHER PUBLICATIONS

Decision to Grant a Patent mailed Jul. 7, 2015, corresponding to Japanese patent application No. 2014-012589.
Office Action mailed Mar. 10, 2015, corresponding to Japanese patent application No. 2014-012589.
Office Action in DE Application No. 102015100749.5, dated Jun. 26, 2017, a partial translation is also attached.

* cited by examiner

Primary Examiner — Monica Carter
Assistant Examiner — Seahee Yoon
(74) Attorney, Agent, or Firm — Hauptman Ham, LLP

(57) ABSTRACT

A rotation table that includes therein a rotation axis, a work placement table connected to one end of the rotation axis, a clamping device configured to hold the work placement table at a stop position, and a switching valve configured to switch the clamping device. The rotation table includes a member, to connect the clamping device and the switching valve to each other, having a pressure fluid supply flow passageway formed therein, so that the clamping device and a flow passageway of the switching valve communicate with each other.

9 Claims, 3 Drawing Sheets

ROTATION TABLE

RELATED APPLICATIONS

The present application claims priority to Japanese Application Number 2014-012589, filed Jan. 27, 2014, the disclosure of which is hereby incorporated by reference herein in its entirety.

BACKGROUND OF THE INVENTION

1. Field of the Invention

The present invention relates to a rotation table mounted onto a tool machine.

2. Description of the Related Art

A rotation table of a tool machine includes a clamping device or a braking device used to maintain an indexing angle during an indexing operation. When a piston inside the clamping device is pressed against a brake disk fixed to a rotation axis, the brake disk is clamped or held to be locked, so that the angle of the rotation axis is maintained. As an example of the rotation table of the tool machine, a table is known in JP-A 2009-248242.

FIG. 5 is a specific cross-sectional view illustrating a basic structure of a rotation table. An axis 2a of the rotation table is rotatably supported inside a casing 1 through a main bearing 3a and a support bearing 3b.

A stator 4b of a motor and a cylinder 7b of a brake, a sensor head 5b, and a lid 8 are fixed to a casing, and a rotor 4a of the motor, a sensor gear 5a, and a disk 6 are fixed to the axis 2a so as to be rotatable along with the rotation table.

A piston 7a is formed so as to be movable forward and backward inside the cylinder 7b through seal members 7c to 7e, and is biased by a plurality of coil springs 7h in a direction in which the piston 7a moves toward the clamping device. Also, a forward movement air chamber 7f and a backward movement air chamber 7g are formed between the piston 7a and the cylinder 7b so that the piston 7a is movable by compressed air.

In an unclamped state, that is, a state where the clamping is released, compressed air is fed to the backward movement air chamber 7g by a switching valve such as an electromagnetic valve not illustrated in FIG. 5, and hence the piston 7a is movable to the backward movement end against the compressing force of the coil spring 7h.

In a clamped state, air is discharged from the backward movement air chamber 7g and compressed air is fed to the forward movement air chamber 7f by the electromagnetic valve so that the piston 7a moves forward and the disk 6 is nipped between the piston 7a and a friction surface 8a on the lid 8.

In order to apply a force necessary for clamping the rotation axis, an air pressure or an oil pressure using a pressure fluid is used, and the switching valve is used to switch the clamped state and the unclamped state. In many cases, the switching valve is provided inside the rotation table since the responsiveness of the piston becomes better as the switching valve becomes closer to the clamping device.

In many cases, the switching valve used to switch the clamping operation and the unclamping operation is provided inside the rotation table so as to be located inside the casing 1 as illustrated in FIG. 6 in order to improve the responsiveness of the piston 7a. In general, a flow passageway used to connect a switching valve 9 and a clamping device 10 to each other is formed by a joint 13 and a pipe 14.

In this case, since there is a need to dispose the joint 13 and the pipe 14 between the clamping device 10 and the switching valve 9, there is a need to attach or detach the pipe 14 connecting the clamping device 10 and the switching valve 9 to each other during the maintenance thereof, and hence a problem arises in that the maintenance requires a time. Further, there is a need to ensure a space for attaching or detaching the pipe in accordance with the arrangement of the clamping device 10 and the switching valve 9, and hence a decrease in the size of the rotation table may be disturbed.

SUMMARY OF THE INVENTION

Therefore, an object of the invention is to provide a rotation table with a flow passageway structure that causes a clamping device and a flow passageway of a switching valve to communicate with each other by fixing a member having a flow passageway formed therein between the clamping device and the switching valve without using a joint and a pipe.

According to the invention, there is provided a rotation table that includes therein a rotation axis, a work placement table connected to one end of the rotation axis, a clamping device configured to hold the work placement table at a stop position, and a switching valve configured to switch the clamping device, comprising a member configured to, connect the clamping device and the switching valve to each other, having a pressure fluid supply flow passageway formed therein, and the clamping device and a flow passageway of the switching valve are configured to communicate with each other.

The member having the pressure fluid supply flow passageway formed therein may include a plurality of flow passageways formed in same member.

Since the joint and the pipe are not used between the clamping device and the switching valve, it is possible to provide the rotation table in which the maintenance of the clamping device and the switching valve is easily performed. Further, since the process space of the pipe is not needed, the rotation table may be decreased in size.

BRIEF DESCRIPTION OF THE DRAWINGS

The object and the feature of the invention will be proved from the description of embodiments below with reference to the accompanying drawings. In these drawings.

DETAILED DESCRIPTION OF THE PREFERRED EMBODIMENTS

Hereinafter, the configurations which are equal or similar to those of the related art will be described by using the same reference signs.

First Embodiment

Figure 1:
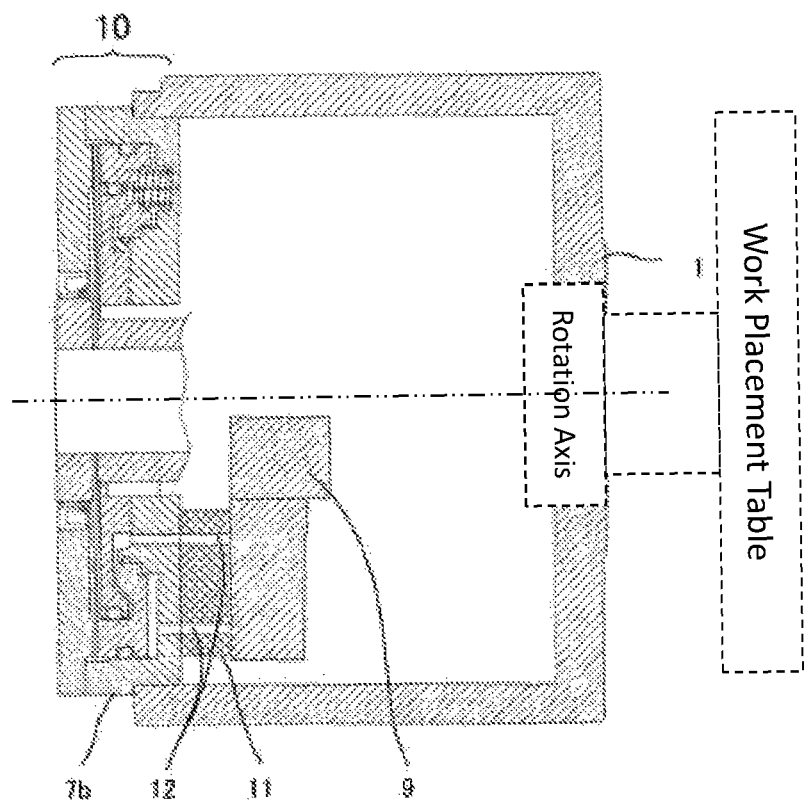
FIG. 1 is a cross-sectional view of a rotation table of a first embodiment of the invention.
Figure 2:
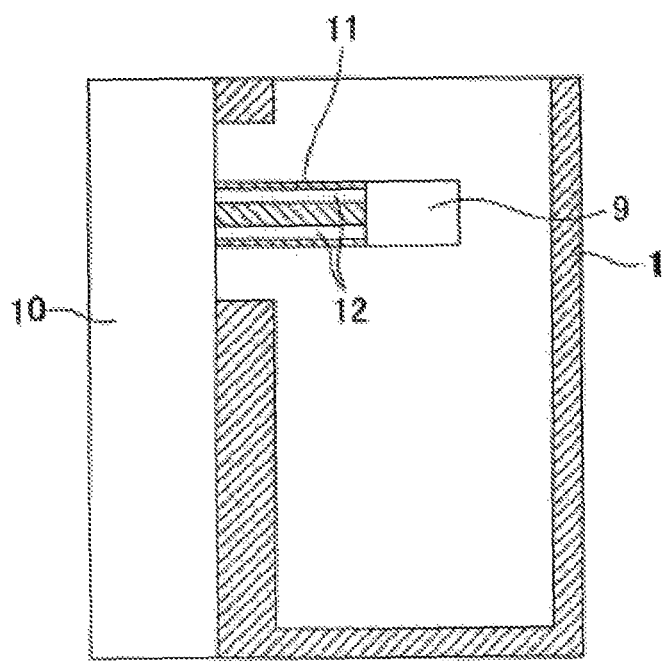
FIG. 2 is a cross-sectional view of the rotation table of the first embodiment of the invention (a cross-sectional view different from that of FIG. 1).

FIG. 1 is a cross-sectional view of a rotation table of a first embodiment of the invention. FIG. 2 is a cross-sectional view of the rotation table of the first embodiment of the invention and is a cross-sectional view different from that of FIG. 1. As illustrated in FIGS. 1 and 2, a manifold 11 which is a member having a flow passageway 12 formed therein is attached between the clamping device 10 and the switching valve 9 so as to enable the communication between the flow passageways of the clamping device 10 and the switching valve 9. The boundary between the manifold 11 and the switching valve 9 and the boundary between the manifold 11 and the clamping device 10 are respectively sealed by, for example, an airtight seal (not illustrated) such as an O-ring. The manifold 11 is formed of metal which is the same as that of the component constituting the rotation table. The flow passageway 12 is formed by forming two penetration holes in the manifold. The manifold 11 is fixed to the casing 1 by a fixing member (not illustrated) such as a bolt. Furthermore, an embodiment may be also employed in which the flow passageway 12 is formed by forming one penetration hole in the manifold 11.

Even in the embodiment, the switching valve is provided inside the rotation table as in the related art, but in this structure, the joint and the pipe are not used. Since the joint and the pipe are not used between the clamping device 10 and the switching valve 9, it is possible to provide the rotation table in which the maintenance of the clamping device 10 and the switching valve 9 may be easily performed. Further, since the process space of the pipe is not needed, the rotation table may be decreased in size.

Second Embodiment

Figure 3:
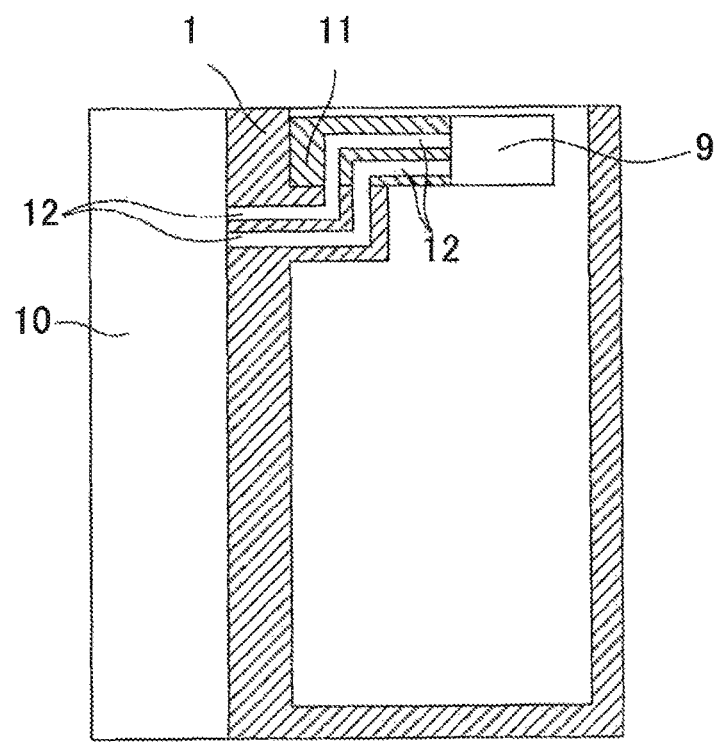
FIG. 3 is a cross-sectional view of a rotation table of a second embodiment of the invention.

Further, FIG. 3 illustrates an embodiment in which the clamping device 10 communicates with the flow passageway of the switching valve 9 by using the manifold 11 which is a member having the first flow passageway 12 formed therein and is mounted between the clamping device 10 and the switching valve 9 and the flow passageway 12 which is formed in the casing 1 as a member forming the second flow passageway 12. This embodiment is an embodiment which causes the clamping device 10 to communicate with the flow passageway of the switching valve 9 through the manifold 11 as the member forming the first flow passageway 12 and the casing 1 as the member forming the second flow passageway 12 when the manifold 11 as the member forming the first flow passageway 12 may not be directly attached to the clamping device 10 as illustrated in FIG. 2.

The boundary between the manifold 11 and the switching valve 9, the boundary between the manifold 11 and the casing 1, and the boundary between the casing 1 and the clamping device 10 are respectively sealed by, for example, an airtight seal (not illustrated) such as an O-ring. The manifold 11 is formed of metal which is the same as that of the component constituting the rotation table. The flow passageway 12 is formed by forming two penetration holes therein.

The manifold 11 is fixed to the casing 1 by a fixing member (not illustrated) such as a bolt. Similarly, the casing 1 is also provided with two penetration holes. Furthermore, an embodiment may be also supposed in which the flow passageway 12 is formed by forming one penetration hole in the manifold 11 and the casing 1.

In the embodiment of FIG. 2 and FIG. 3, since there is no need to provide a joint or a pipe in order to directly fix the clamping device 10 and the switching valve 9 to the member forming the flow passageway 12 and there is no need to perform the troublesome pipe attachment/detachment operation during the maintenance, the maintenance of the clamping device 10 and the switching valve 9 may be easily performed. Further, since there is no need to prepare the space for the joint and the pipe, the rotation table may be decreased in size.

Figure 4:
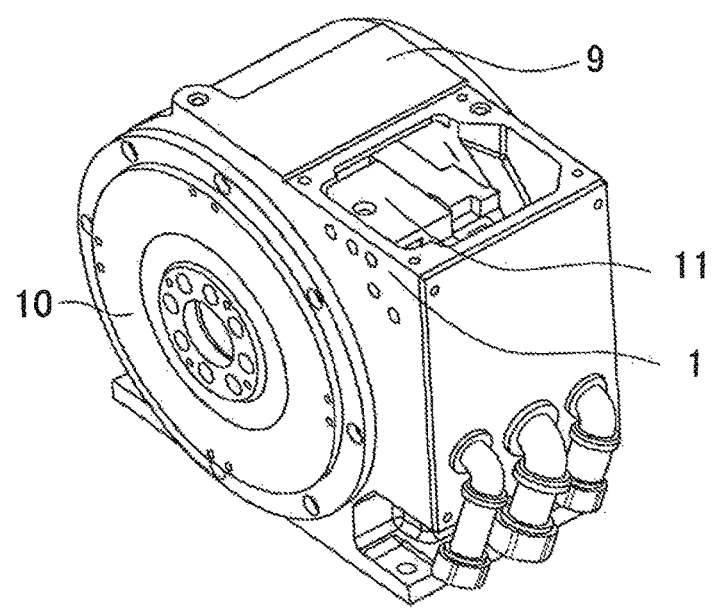
FIG. 4 is an external view of the rotation table.
Figure 5:
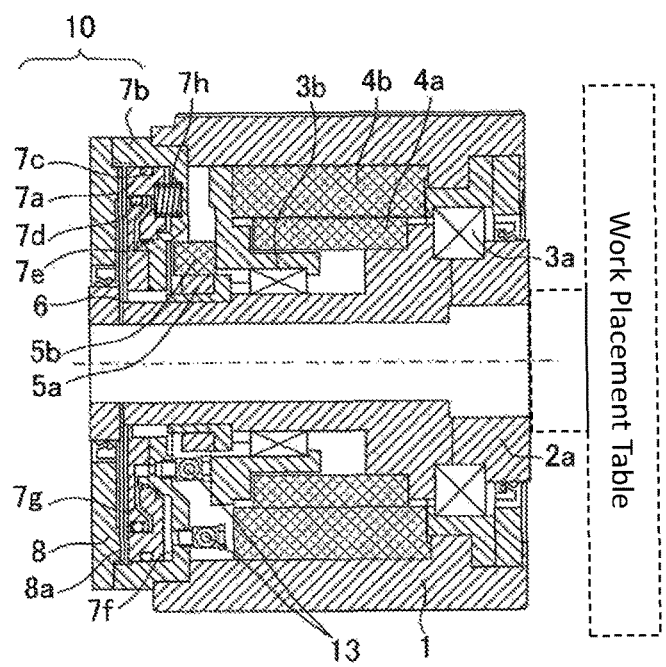
FIG. 5 is a specific cross-sectional view illustrating the inner configuration of the rotation table.
Figure 6:
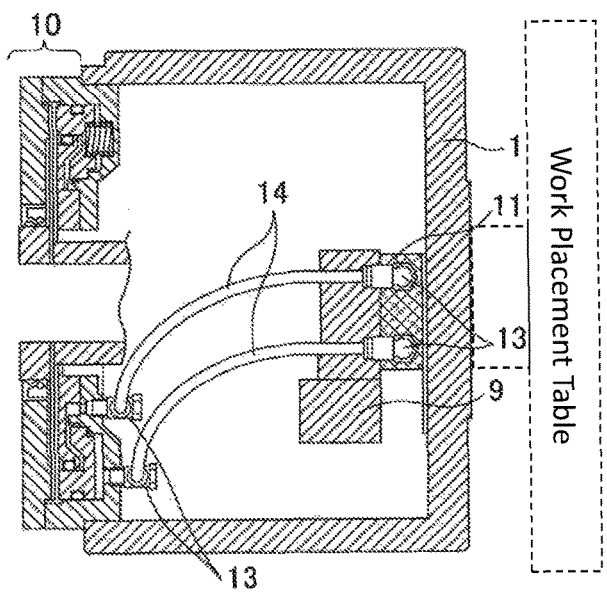
FIG. 6 is a cross-sectional view of a rotation table of the related art.

FIG. 4 is a specific embodiment of FIG. 3. The clamping device 10 is attached to the casing 1, and the switching valve 9 is attached to the manifold 11. Further, when the manifold 11 is fixed to the casing 1 by a fixing member (not illustrated), the clamping device 10 may communicate with the flow passageway of the switching valve 9 without the joint and the pipe. Further, when the switching valve 9 is disposed at the outside of the rotation table, the maintenance may be easily performed.

The invention claimed is:

1. A rotation table, comprising:
   a rotation axis;
   a work placement table connected to one end of the rotation axis;
   a clamping device configured to hold the work placement table at a stop position;
   a switching valve configured to switch the clamping device; and
   a member configured to connect the clamping device to the switching valve, said member having a pressure fluid supply flow passageway, and the member being free of a joint and a pipe,
   wherein the clamping device and the switching valve are configured to communicate with each other.

2. The rotation table according to claim 1, wherein the member having the pressure fluid supply flow passageway formed therein includes a plurality of flow passageways formed in the member.

3. The rotation table according to claim 1, wherein a boundary between the member and the switching valve is sealed, and a boundary between the member and the clamping device is sealed.

4. The rotation table according to claim 1, wherein the member is formed of the same metal as that of a component constituting the rotation table.

5. The rotation table according to claim 1, wherein the pressure fluid supply flow passageway is formed by a penetration hole formed in the member.

6. The rotation table according to claim 1, wherein the member is directly attached to the clamping device.

7. A rotation table, comprising:
   a casing;
   a rotation axis rotatably supported in the casing;
   a work placement table connected to one end of the rotation axis;
   a clamping device configured to hold the work placement table at a stop position;
   a switching valve provided in the casing, the switching valve being configured to switch the clamping device; and
   a member configured to connect a flow passageway of the casing to the switching valve, said member having a pressure fluid supply flow passageway, and said member being free of a joint and a pipe,
   wherein
   the clamping device is connected to the switching valve through the casing and the member,
   a boundary between the member and the switching valve, and a boundary between the member and the clamping device are sealed, and the clamping device is configured to communicate with the switching valve through the flow passageway of the casing and the pressure fluid supply flow passageway of the member.

8. The rotation table according to claim 7, wherein the member is formed of the same metal as that of a component constituting the rotation table.

9. The rotation table according to claim 7, wherein the pressure fluid supply flow passageway is formed by a penetration hole formed in the member.

* * * * *